(No Model.)
I. GILES.
APPARATUS FOR EXTRACTING MEAT JUICE.
No. 413,777. Patented Oct. 29, 1889.
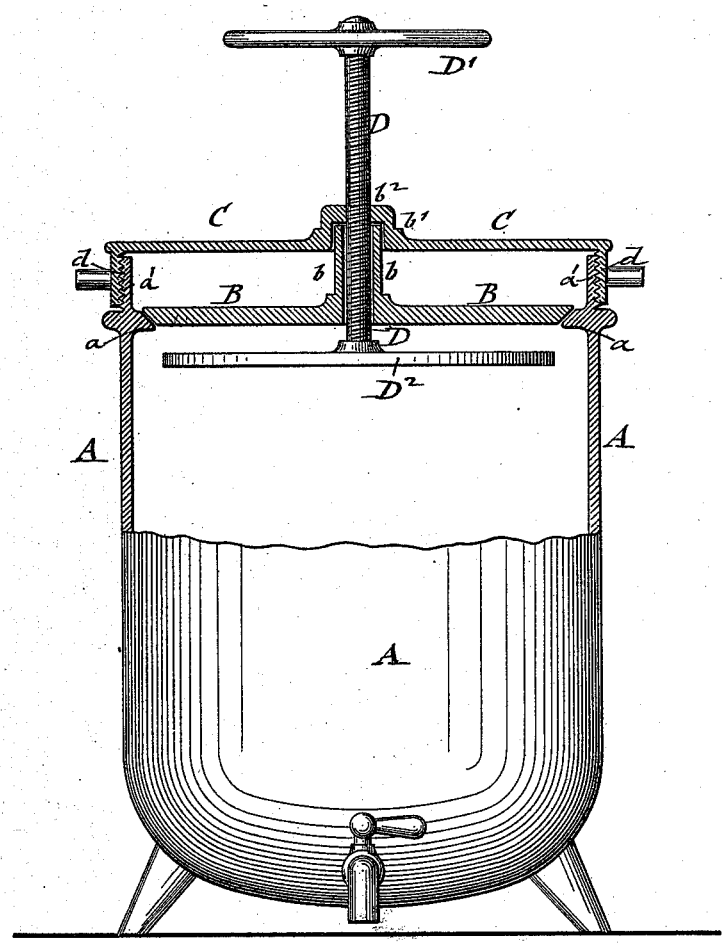

UNITED STATES PATENT OFFICE.

ISAAC GILES, OF NEW YORK, N. Y.

APPARATUS FOR EXTRACTING MEAT-JUICE.

SPECIFICATION forming part of Letters Patent No. 413,777, dated October 29, 1889.

Application filed October 27, 1888. Serial No. 289,296. (No model.)

*To all whom it may concern:*

Be it known that I, ISAAC GILES, of the city, county, and State of New York, have invented certain new and useful Improvements in Presses for Extracting Meat-Juice, of which the following is a specification.

This invention relates to an improved press for extracting the juice from chopped meat in a quick, effective, and convenient manner; and the invention consists of an extracting device comprising an exterior vessel having an interior seat and an exteriorly-threaded rim, a cover having a center sleeve, a screw-cap screwing on the rim and having a central screw-nut, a follower at the interior of the vessel, and a screw-spindle attached to the follower and passed through the central screw-nut of the cap to the outside of the vessel.

The accompanying drawing represents a side elevation, partly in section, of my improved press for extracting meat-juice.

A in the drawing represents a vessel, which is made of any suitable metal and provided near its rim with an interior shoulder or seat $a$ and with an exteriorly-threaded rim $a'$ above the same. On the interior seat $a$ is supported a cover B, which is provided with a central sleeve $b$. A cap C, with an interiorly-threaded flange $d$, is screwed on the exteriorly-threaded rim $a'$ of the vessel A, its center portion $b'$ bearing on the sleeve $b$, so as to retain it tightly on the seat $a$, while the cap also produces the hermetical closing of the vessel. The cap C is provided with a center nut $b^2$ in line with the sleeve $b$, which nut engages a screw-spindle D, that passes through the sleeve of the cover B and has a hand-wheel D' at the outer end and a follower $D^2$ at the inner end within the vessel A, said follower serving to express the juice that remains in the chopped meat after the main portion of the same has been drawn off through a bottom opening provided with a suitable faucet. The meat is boiled in the vessel A without the addition of water, so that the pure extract of meat is obtained. By screwing down the follower $D^2$ in the vessel A the juice still in the body of meat is pressed from the same, and thereby a greater quantity of juice obtained from the meat without removing the same from the vessel than when simply drawing off the juice.

By the apparatus beef-tea and other meat-juices can be quickly and conveniently prepared and a pure extract of meat obtained thereby.

I do not claim anything which is described and claimed in an application filed by me on February 20, 1889, Serial No. 300,576.

Having thus described my invention, I claim as new and desire to secure by Letters Patent—

The combination of an exterior vessel A, having an interior seat $a$ and an exteriorly-threaded rim $a'$, a cover B, having a center sleeve $b$, a screw-cap C, screwing on the rim and having a central screw-nut, a follower at the interior of the vessel, and a screw-spindle attached to the follower and passed to the outside of the vessel, substantially as set forth.

In testimony that I claim the foregoing as my invention I have signed my name in presence of two subscribing witnesses.

ISAAC GILES.

Witnesses:
PAUL GOEPEL,
CARL KARP.